United States Patent
Bishara et al.

(10) Patent No.: US 9,210,107 B2
(45) Date of Patent: *Dec. 8, 2015

(54) METHOD AND APPARATUS FOR ADJUSTING A RATE AT WHICH DATA IS TRANSFERRED, WITHIN A NETWORK DEVICE, FROM A MEDIA ACCESS CONTROLLER TO A MEMORY CONNECTED BETWEEN THE MEDIA ACCESS CONTROLLER AND A PHYSICAL-LAYER DEVICE

(71) Applicant: Marvell World Trade Ltd., St. Michael (BB)

(72) Inventors: Nafea Bishara, San Jose, CA (US); William Lo, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 145 days.

This patent is subject to a terminal disclaimer.

(21) Appl. No.: 14/047,533

(22) Filed: Oct. 7, 2013

(65) Prior Publication Data
US 2014/0036933 A1 Feb. 6, 2014

Related U.S. Application Data

(63) Continuation of application No. 11/696,476, filed on Apr. 4, 2007, now Pat. No. 8,553,720.

(60) Provisional application No. 60/793,118, filed on Apr. 19, 2006.

(51) Int. Cl.
*H04J 3/16* (2006.01)
*G01R 31/08* (2006.01)
(Continued)

(52) U.S. Cl.
CPC ........ *H04L 49/9084* (2013.01); *H04L 12/4013* (2013.01); *H04L 47/10* (2013.01); *H04L 47/22* (2013.01); *H04L 49/90* (2013.01); *H04L 49/9078* (2013.01); *Y02B 60/31* (2013.01)

(58) Field of Classification Search
CPC ....................................................... H04L 47/10
USPC .......................................... 370/230, 231, 232
See application file for complete search history.

(56) References Cited

U.S. PATENT DOCUMENTS 4,320,520 A 3/1982 Graham
4,914,394 A 4/1990 Meyer
(Continued)

FOREIGN PATENT DOCUMENTS

EP 1 848 154 10/2007
EP 1848156 10/2007
(Continued)

OTHER PUBLICATIONS

IEEE Std. 802.3x-2005; Section Two (Clause 21 through Clause 33 and Annex 22A through Annex 32A); Information Technology—Telecommunications and information exchange between systems—Local and metropolitan area networks—Specific requirments—Part 3; Carrier Sense Multiple Access with Collision Detection (CSMA/CD)access method and physical layer specifications; 810 pages.
(Continued)

*Primary Examiner* — Samina Choudhry

(57) ABSTRACT

A first network device includes a host and a memory. A media access controller receives data from the host and stores the data in the memory at a first rate. A physical-layer device receives the data from the memory and transmits the data from the first network device to a second network device. The memory is connected between the media access controller and the physical-layer device. An amount of the data stored in the memory is based on the first rate and a second rate at which the physical-layer device transfers the data from the memory to the second network device. The first rate is greater than the second rate. A control circuit, based on an amount of the data stored in the memory, transmits a first frame to the media access controller. The media access controller, in response to the first frame, decreases the first rate.

20 Claims, 2 Drawing Sheets

(51) Int. Cl.
*H04L 12/861* (2013.01)
*H04L 12/40* (2006.01)
*H04L 12/801* (2013.01)
*H04L 12/815* (2013.01)

(56) References Cited

U.S. PATENT DOCUMENTS

| | | | |
|---|---|---|---|
| 5,420,512 A | 5/1995 | Spillane et al. | |
| 5,461,318 A | 10/1995 | Borchert et al. | |
| 5,905,870 A * | 5/1999 | Mangin et al. | 709/234 |
| 6,081,523 A | 6/2000 | Merchant et al. | |
| 6,138,080 A | 10/2000 | Richardson | |
| 6,141,352 A | 10/2000 | Gandy | |
| 6,167,029 A | 12/2000 | Ramakrishnan | |
| 6,198,727 B1 | 3/2001 | Wakeley et al. | |
| 6,222,852 B1 * | 4/2001 | Gandy | 370/463 |
| 6,295,281 B1 | 9/2001 | Itkowsky | |
| 6,377,640 B2 | 4/2002 | Trans | |
| 6,434,716 B1 | 8/2002 | Johnson et al. | |
| 6,438,163 B1 | 8/2002 | Raghavan et al. | |
| 6,448,899 B1 | 9/2002 | Thompson | |
| 6,522,152 B1 | 2/2003 | Tonti et al. | |
| 6,535,983 B1 | 3/2003 | McCormack et al. | |
| 6,600,755 B1 | 7/2003 | Overs et al. | |
| 6,625,116 B1 | 9/2003 | Schneider et al. | |
| 6,694,017 B1 | 2/2004 | Takada | |
| 6,728,216 B1 | 4/2004 | Sterner | |
| 6,775,529 B1 | 8/2004 | Roo | |
| 6,816,505 B1 | 11/2004 | Sutardja et al. | |
| 6,825,672 B1 | 11/2004 | Lo | |
| 6,829,223 B1 | 12/2004 | Richardson | |
| 6,882,661 B1 | 4/2005 | Creedon et al. | |
| 7,005,861 B1 | 2/2006 | Lo et al. | |
| 7,127,481 B1 | 10/2006 | Lam | |
| 7,161,911 B1 | 1/2007 | Fang et al. | |
| 7,203,851 B1 | 4/2007 | Lo et al. | |
| 7,272,114 B1 | 9/2007 | Barkan | |
| 7,286,469 B2 | 10/2007 | Kauschke et al. | |
| 7,317,732 B2 | 1/2008 | Mills et al. | |
| 7,379,422 B2 | 5/2008 | Nation | |
| 7,385,920 B2 | 6/2008 | Zhang et al. | |
| 7,447,168 B2 | 11/2008 | Thaler | |
| 7,542,415 B2 | 6/2009 | Kang | |
| 7,580,634 B2 | 8/2009 | Takeuchi et al. | |
| 7,624,197 B1 | 11/2009 | Lo et al. | |
| 7,649,843 B2 | 1/2010 | Shanley et al. | |
| 7,688,749 B1 | 3/2010 | Lo et al. | |
| 7,701,861 B1 | 4/2010 | Barkan | |
| 7,961,831 B2 | 6/2011 | Ran | |
| 8,179,910 B2 | 5/2012 | Diab et al. | |
| 8,243,752 B2 | 8/2012 | Barkan et al. | |
| 8,295,259 B1 | 10/2012 | Bagchi | |
| 8,355,404 B2 | 1/2013 | Powell et al. | |
| 8,416,699 B1 | 4/2013 | Lo | |
| 8,553,709 B2 | 10/2013 | Diab et al. | |
| 8,553,720 B2 | 10/2013 | Bishara et al. | |
| 8,699,514 B2 | 4/2014 | Huff et al. | |
| 8,824,502 B2 | 9/2014 | Barkan et al. | |
| 2001/0038674 A1 | 11/2001 | Trans | |
| 2002/0080884 A1 | 6/2002 | Lee | |
| 2002/0124110 A1 | 9/2002 | Tanaka | |
| 2002/0181633 A1 | 12/2002 | Trans | |
| 2004/0001435 A1 | 1/2004 | Wong | |
| 2004/0120334 A1 | 6/2004 | Nation | |
| 2004/0258085 A1 | 12/2004 | Costo | |
| 2005/0013250 A1 * | 1/2005 | Kauschke et al. | 370/235 |
| 2005/0015535 A1 | 1/2005 | Lindsay et al. | |
| 2005/0030899 A1 | 2/2005 | Kang | |
| 2005/0059417 A1 | 3/2005 | Zhang et al. | |
| 2005/0141551 A1 | 6/2005 | McNeil | |
| 2005/0174926 A1 | 8/2005 | Barrass | |
| 2006/0045009 A1 | 3/2006 | Madison | |
| 2006/0215626 A1 | 9/2006 | Ross | |
| 2006/0268709 A1 | 11/2006 | Singla et al. | |
| 2006/0280132 A1 | 12/2006 | Connor | |
| 2007/0002990 A1 | 1/2007 | Lee et al. | |
| 2007/0248024 A1 | 10/2007 | Conway | |
| 2008/0056284 A1 | 3/2008 | Powell et al. | |
| 2008/0069014 A1 | 3/2008 | Powell et al. | |
| 2008/0069144 A1 | 3/2008 | Yu et al. | |
| 2009/0125735 A1 | 5/2009 | Zimmerman | |
| 2009/0245274 A1 | 10/2009 | Hurwitz et al. | |
| 2010/0046521 A1 | 2/2010 | Wong | |
| 2013/0117639 A1 | 5/2013 | Ganga et al. | |

FOREIGN PATENT DOCUMENTS

| | | |
|---|---|---|
| JP | 2005136510 A | 5/2005 |
| JP | 2006141011 A | 6/2006 |
| WO | WO01/11861 | 2/2001 |
| WO | WO2005/104698 | 11/2005 |
| WO | WO2006/078928 | 7/2006 |
| WO | WO2007/054815 | 5/2007 |
| WO | WO 2007/054815 | 5/2007 |

OTHER PUBLICATIONS

Intel, "LXT9764 Octal 10/100 Transceiver Hardware Integrity Function Overview" Application Note. Jan. 2001, pp. 3-14.

IEEE Computer Society; IEEE Standard 802.3ab; IEEE Std. 802.3-2002, IEEE Standard for Information Technology—Telecommunications and Information exchange between systems—Local and metropolitan area networks—Specific requirements; Part 3: Carrier sense multiple access with collision detection (CSMA/CD) acces method and physical layer specifications, Mar. 8, 2002, pp. 147-249.

PCT International Search Report and Written Opinion dated Oct. 29, 2007 for International Application No. PCT/US2007/0090673; 14 pages.

IEEE Std. 802.3x-2005; Section Two (Clause 21 through Clause 33 and Annex 22A through Annex 32A); Information Technology—Telecommunications and Information exchange between systems—Local and metropolitan area neworks—Specific requirements—Part 3: Cartier Sense Multiple Access with Collision Detection (CSMA/CD) access method and physical layer specifications: 810 pages.

IEEE Std 802.3-2002 (Revision of IEEE Std 802.3, 2000 Edition); 802.3 IEEE Standard for Information Technotogy—Telecommunications and information exchange between systems—Local and metropolitan area neworks—Specific requirements—Part 3: Carrier Sense Multiple Access with Collision Detection (CSMA/CD) access method and physical layer specifications; IEEE Computer Society; Sponsored by the LAN/MAN Standards Committee (pp. 1-552).

(Section Two) Information Technology—Telecommunications and Information exchange between systems—Local nad metropolitan area networks—Specific requirements—Part 3: Carrier Sense Multiple Access with Collision Detelction (CMSA/CD) access method and physical layer specifications (pp. 1-581).

(Section Three) Information Technology—Telecommunications and Information exchange between systems—Local and metropolitan area networks—Specific requirements—Part 3: Carrier Sense Multiple Access with Collision Detection (CSMA/CD) access method and physical layer specifications (pp. 1-379).

U.S. Appl. No. 09/991,043, filed Nov. 24, 2001; Apparatus and Method for Automatic Speed Downshift for a Two Pair Cable; William Lo; 61 pages.

U.S. Appl. No. 60/217,418, filed Jul. 11, 2000; Finite Impulse Response Filter; Yat-Tung Lam; 35 pages.

International Search Report for Application No. PCT/US2008/086450 (corresponding to U.S. Appl. 12/330,823) mailed Mar. 8, 2009.

PCT International Search Report and Written Opinion dated Oct. 29, 2007 for International Application No. PCT/US2007/009573; 14 pages.

* cited by examiner

METHOD AND APPARATUS FOR ADJUSTING A RATE AT WHICH DATA IS TRANSFERRED, WITHIN A NETWORK DEVICE, FROM A MEDIA ACCESS CONTROLLER TO A MEMORY CONNECTED BETWEEN THE MEDIA ACCESS CONTROLLER AND A PHYSICAL-LAYER DEVICE

CROSS-REFERENCE TO RELATED APPLICATIONS

The present disclosure is a continuation of U.S. patent application Ser. No. 11/696,476 (now U.S. Pat. No. 8,553,720), filed on Apr. 4, 2007. This application claims the benefit of U.S. Provisional Application No. 60/793,118 filed on Apr. 19, 2006. The entire disclosures of the applications referenced above are incorporated herein by reference.

BACKGROUND

The present invention relates generally to data communications. More particularly, the present invention relates to adaptive speed control for interfaces between media access controllers (MAC) and physical-layer devices (PHY).

SUMMARY

A first network device is provided and includes a host, a memory, a media access controller, a physical-layer device, and a control circuit. The media access controller is configured to (i) receive data from the host, and (ii) store the data in the memory at a first rate. The physical-layer device configured to (i) receive the data from the memory, and (ii) transmit the data from the first network device to a second network device. The memory is connected between the media access controller and the physical-layer device. An amount of the data stored in the memory is based on (i) the first rate at which the media access controller stores the data from the host in the memory, and (ii) a second rate at which the physical-layer device transfers the data from the memory to the second network device. The first rate is greater than the second rate. The control circuit configured to (i) monitor the amount of the data stored in the memory, and (ii) based on the amount of the data stored in the memory, transmit a first frame to the media access controller. The media access controller is configured to, in response to the first frame, decrease the first rate at which the media access controller transfers the data from the host to the memory.

In other features, a method is provided for adjusting a rate at which data is transferred from a media access controller to a memory. The memory is connected between the media access controller and a physical layer device. Each of the media access controller, the memory, and the physical layer device are implemented in a first network device. The method includes: receiving data from a host at the media access controller, where the host is also implemented in the first network device; storing, via the media access controller, the data in the memory at a first rate; transferring the data stored in the memory to the physical-layer device; and transmitting, from the first network device to a second network device via the physical-layer device, the data transferred to the physical layer device. The data is transferred to the physical layer device is transmitted, at a second rate, by the physical layer device to the second network device, wherein the second rate is less than the first rate. An amount of the data stored in the memory is monitored. The amount of the data stored in the memory is based on each of the first rate and the second rate. Based on the amount of the data stored in the memory, a first frame is transmitted to the media access controller. In response to the first frame, the first rate at which the media access controller transfers the data from the host to the memory is decreased.

In general, in one aspect, the invention features an apparatus comprising: a first first-in first-out buffer (FIFO) to receive and store data from a media access controller (MAC); a physical-layer device (PHY) to transmit a signal representing the data; and a control circuit comprising a read circuit to transfer the data from the first FIFO to the PHY, and a transmit pause circuit to transmit a pause frame to the MAC when an amount of the data stored in the first FIFO exceeds a predetermined threshold.

In some embodiments, the pause frame comprises a IEEE 802.3x pause frame. Some embodiments comprise an integrated circuit comprising the apparatus. Some embodiments comprise the MAC. In some embodiments, the MAC comprises a 10 Gbps single-speed MAC, the PHY comprises a quad-speed PHY having speeds of 10 Mbps, 100 Mbps, 1 Gbps, and 10 Gbps, and the MAC and the PHY communicate over a single-speed interface. In some embodiments, the single-speed interface comprises a XAUI interface. Some embodiments comprise a network device comprising the apparatus. In some embodiments, the network device is selected from the group consisting of: a network switch; a router; and a network interface controller. In some embodiments, the control circuit further comprises: a receive pause circuit to pause the transfer of the data from the first FIFO to the PHY when the PHY receives a second signal representing a second pause frame. In some embodiments, the second pause frame comprises a IEEE 802.3x pause frame. In some embodiments, the PHY receives signals representing frames of data sent by a peer device; and wherein the control circuit drops one or more of the frames of data. Some embodiments comprise management information base (MIB) drop counter to count the dropped frames of the data. Some embodiments comprise a second FIFO to store frames of data received by the PHY from a peer device; wherein the control circuit retrieves the frames of data from second FIFO, and transmits the frames of data to the MAC. In some embodiments, the read circuit transfers the data from the first FIFO to the PHY again when needed in half-duplex mode. In some embodiments, the PHY receives a pause frame from the MAC and transmits a signal representing the pause frame.

In general, in one aspect, the invention features an apparatus comprising: first buffer means for receiving and storing data from a media access controller (MAC); physical-layer means for transmitting a signal representing the data; and means for controlling comprising read means for transferring the data from the first buffer to the physical-layer means, and transmit pause means for transmitting a pause frame to the MAC when an amount of the data stored in the first buffer exceeds a predetermined threshold.

In some embodiments, the pause frame comprises a IEEE 802.3x pause frame. Some embodiments comprise an integrated circuit comprising the apparatus. Some embodiments comprise the MAC. In some embodiments, the MAC comprises a 10 Gbps single-speed MAC, the physical-layer means comprises a quad-speed physical-layer means having speeds of 10 Mbps, 100 Mbps, 1 Gbps, and 10 Gbps, and the MAC and the physical-layer means communicate over a single-speed interface. In some embodiments, the single-speed interface comprises a XAUI interface. Some embodiments comprise a network device comprising the apparatus. In some embodiments, the network device is selected from the group consisting of: a network switch; a router; and a network interface controller. In some embodiments, the means for controlling further comprises: receive pause means for pausing the transfer of the data from the first buffer to the physical-layer means when the physical-layer means receives a second signal representing a second pause frame. In some embodiments, the second pause frame comprises a IEEE 802.3x pause frame. In some embodiments, the physical-layer means receives signals representing frames of data sent by a peer device; and wherein the means for controlling drops one or more of the frames of data. Some embodiments comprise means for counting the dropped frames of the data. Some embodiments comprise second buffer means for storing frames of data received by the physical-layer means from a peer device; wherein the means for controlling retrieves the frames of data from the second buffer means, and transmits the frames of data to the MAC. In some embodiments, the read circuit transfers the data from the first FIFO to the physical-layer means again when needed in half-duplex mode. In some embodiments, the physical-layer means receives a pause frame from the MAC and transmits a signal representing the pause frame.

In general, in one aspect, the invention features a method comprising: storing data received from a media access controller (MAC) at a first data rate; retrieving the stored data at a second data rate; generating a signal representing the retrieved data; and generating a pause frame when an amount of the stored data exceeds a predetermined threshold.

Some embodiments comprise receiving the data from the MAC. Some embodiments comprise transmitting the pause frame to the MAC. In some embodiments, the pause frame comprises a IEEE 802.3x pause frame. Some embodiments comprise receiving signals representing frames of data sent by a peer device; and dropping one or more of the frames of data. Some embodiments comprise counting the dropped frames of data. Some embodiments comprise receiving signals representing frames of data sent by a peer device; storing the frames of data in a buffer; retrieving the frames of data from the buffer; and transmitting the frames of data to the MAC. Some embodiments comprise pausing the retrieving of the data when a second signal representing a second pause frame is received. In some embodiments, the second pause frame comprises a IEEE 802.3x pause frame. Some embodiments comprise generating the signal representing the retrieved data again when needed in half-duplex mode. Some embodiments comprise receiving a pause frame from the MAC; and transmitting a signal representing the pause frame.

In general, in one aspect, the invention features a computer program executable on a processor, comprising: instructions for storing data received from a media access controller (MAC) at a first data rate; instructions for retrieving the stored data at a second data rate; wherein a physical-layer device to generate a signal representing the retrieved data; and instructions for generating a pause frame when an amount of the stored data exceeds a predetermined threshold.

Some embodiments comprise instructions for transmitting the pause frame to the MAC. In some embodiments, the pause frame comprises a IEEE 802.3x pause frame. Some embodiments comprise, wherein signals are received representing frames of data sent by a peer device, instructions for dropping one or more of the frames of data. Some embodiments comprise instructions for counting the dropped frames of data. Some embodiments comprise, wherein signals are received representing frames of data sent by a peer device, instructions for storing the frames of data in a buffer; instructions for retrieving the frames of data from the buffer; and wherein the frames of data are transmitted to the MAC. Some embodiments comprise instructions for pausing the retrieving of the data when a second signal representing a second pause frame is received. In some embodiments, the second pause frame comprises a IEEE 802.3x pause frame. Some embodiments comprise instructions for generating the signal representing the retrieved data again when needed in half-duplex mode.

The details of one or more implementations are set forth in the accompanying drawings and the description below. Other features will be apparent from the description and drawings, and from the claims.

Figure 1:
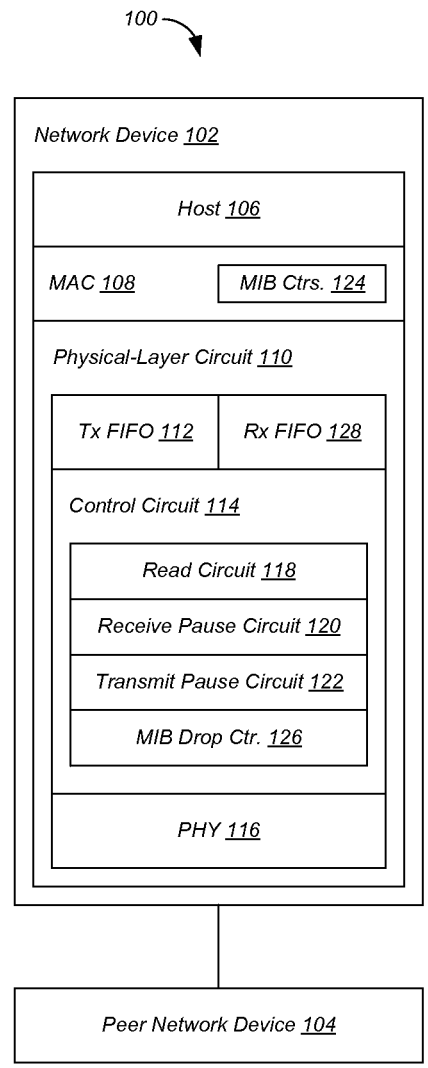
FIG. 1 shows a data communication system comprising a network device in communication with a peer network device according to some embodiments of the present invention.

The leading digit(s) of each reference numeral used in this specification indicates the number of the drawing in which the reference numeral first appears.

DESCRIPTION

In conventional data communications systems, a multi-speed media access controller (MAC) is generally connected to a multi-speed physical-layer device (PHY) by a multi-speed interface. In such systems, the PHY speed is set by auto-negotiation, software, or the like, and the MAC adapts its speed accordingly.

However, in some systems, the MAC may not support all the data rates supported by the PHY, or vice versa. For example, when a single-speed MAC is connected by a single-speed interface to a multi-rate PHY, the PHY may operate at a speed that is not supported by the MAC. As another example, even though the MAC and PHY are both multi-speed, either may support a speed not supported by the other.

Embodiments of the present invention provide adaptive speed control for MAC-PHY interfaces. According to these embodiments, a first-in first-out buffer (FIFO) buffers data sent from the MAC to the PHY, and a control circuit sends a pause frame to the MAC when the amount of data in the FIFO exceeds a predetermined threshold. Flow control can be enabled in the MAC according to IEEE standard 802.3x, and each pause frame can comprise an IEEE 802.3x pause frame.

Flow control with peer devices can be implemented by the control circuit. For example, the control circuit auto-negotiates with peer devices to implement flow control according to IEEE standard 802.3x. When the control circuit receives a pause frame from a peer device, the control circuit pauses the flow of data from the FIFO to the PHY.

FIG. 1 shows a data communication system 100 comprising a network device 102 in communication with a peer network device 104 according to some embodiments of the present invention. Network device 102 comprises a host 106 in communication with a media access controller (MAC) 108, which is in communication with a physical-layer circuit 110, which is in communication with peer network device 104. Physical-layer circuit 110 comprises a transmit first-in first-out buffer (FIFO) 112, a control circuit 114, and a physical-layer device (PHY) 116. Control circuit 114 comprises a read circuit 118, a receive pause circuit 120, and a transmit pause circuit 122. MAC 108 can comprise a plurality of conventional management information base (MIB) counters 124. A MIB is a database used to manage network communication devices, as is well-known in the relevant arts. Physical-layer circuit 110 can comprise a MIB drop counter 126 to count dropped frames.

Physical-layer circuit 110 can also include a receive FIFO 128 to buffer data received from peer network device 104. That is, receive FIFO 128 stores frames of data received by PHY 116 from peer network device 104, and control circuit 114 retrieves the frames of data from receive FIFO 128 and transmits the frames of data to MAC 108. Because the data rate of MAC 108 exceeds the data rate of PHY 116, all or nearly all of each frame should be stored in receive FIFO 128 before transmitting the frame to MAC 108 to prevent underrun of receive FIFO 128.

Network device 102 can be implemented as a switch, router, network interface controller (NIC), and the like. Physical-layer circuit 110 can be implemented as one or more integrated circuits.

In some embodiments, MAC 108 is a 10 Gbps single-speed MAC, PHY 116 is a quad-speed PHY having speeds of 10 Mbps, 100 Mbps, 1 Gbps, and 10 Gbps, and MAC 108 and physical-layer circuit 110 communicate over a single-speed interface such as XAUI. In other embodiments, MAC 108 is a multi-speed MAC that communicates with physical-layer circuit 110 over a multi-speed interface.

Figure 2:
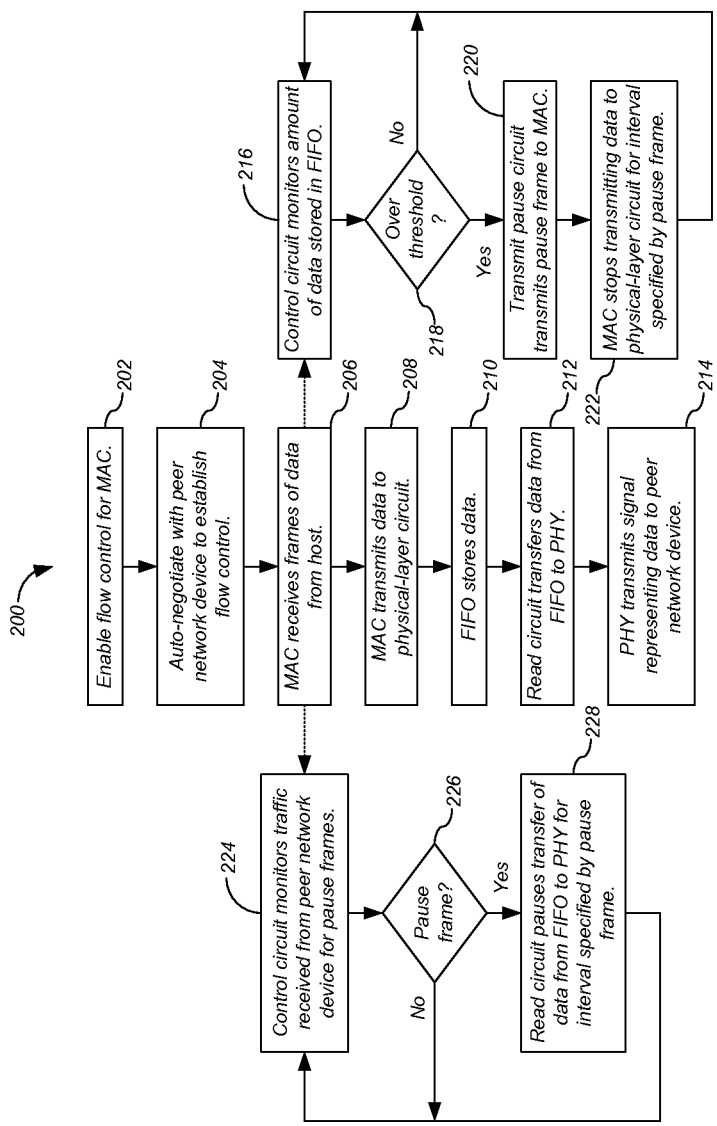
FIG. 2 shows a process for the data communications system of FIG. 1 according to some embodiments of the present invention.

FIG. 2 shows a process for data communications system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

When network device 102 boots up, flow control is enabled for MAC 108 (step 202), and control circuit 114 can auto-negotiate with peer network device 104 to establish flow control (step 204). The flow control mechanism can be IEEE 802.3x flow control.

MAC 108 receives frames of data from host 106 to be transmitted to peer network device 104 (step 206), and transmits the data to physical-layer circuit 110 (step 208), which stores the data in FIFO 112 as it is received (step 210). Read circuit 118 transfers the data from FIFO 112 to PHY 116 at the data rate required by PHY 116 (step 212). PHY 116 transmits a signal representing the data to peer network device 104 (step 214).

Control circuit 114 monitors the amount of data stored in FIFO 112 (step 216). Because the data rate of MAC 108 exceeds the data rate of PHY 116, the amount of data stored in FIFO 112 will increase. When the amount of data stored in FIFO 112 exceeds a predetermined threshold (step 218), transmit pause circuit 122 transmits a pause frame to MAC 108 (step 220). The pause frame can be a IEEE 802.3x pause frame, and IEEE 802.3x flow control is always enabled for MAC 108. Therefore, MAC 108 stops transmitting data to physical-layer circuit 110 for the interval specified by the pause frame (step 222).

In some cases, control circuit 114 and peer network device 104 auto-negotiates to implement flow control. Control circuit 114 monitors traffic received from peer network device 104 for the presence of pause frames (step 224). When control circuit 114 determines that a pause frame has been received from peer network device 104 (step 226), read circuit 118 pauses the transfer of data from FIFO 112 to PHY 116 for the interval specified by the received pause frame (step 228). The pause frame is not transferred to MAC 108.

Because flow control is always enabled for MAC 108, MAC 108 may generate pause frames. When physical-layer circuit 110 receives a pause frame from MAC 108, PHY 116 simply transmits a signal representing the pause frame to peer network device 104. In some embodiments, control circuit 114 is also responsible for half-duplex and retransmission if needed. That is, read circuit 118 transfers data from FIFO 112 to PHY 116 again when needed in half-duplex mode, for example following a collision during transmission by PHY 116 of a signal representing the data.

When flow control is disabled with peer network device 104, physical-layer circuit 110 can drop frames of data received from peer network device 104. Because the frames are dropped in physical-layer circuit 110, the drops will not be recorded by MIB counters 124 in MAC 108. Therefore, in some embodiments, physical-layer circuit 110 comprises a MIB drop counter 126 to count the dropped frames.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:
1. A first network device comprising:
 a host;
 a memory;
 a media access controller configured to (i) receive data from the host, and (ii) store the data in the memory at a first rate;
 a physical-layer device configured to (i) receive the data from the memory, and (ii) transmit the data from the first network device to a second network device, wherein the memory is connected between the media access controller and the physical-layer device, and wherein an amount of the data stored in the memory is based on (i) the first rate at which the media access controller stores the data from the host in the memory, and (ii) a second rate at which the physical-layer device transfers the data from the memory to the second network device, and wherein the first rate is greater than the second rate; and a control circuit configured to (i) monitor the amount of the data stored in the memory, and (ii) based on the amount of the data stored in the memory, transmit a first frame to the media access controller, wherein the control circuit is connected between the media access controller and the physical-layer device, and wherein the media access controller is configured to, in response to the first frame, decrease the first rate at which the media access controller transfers the data received from the host to the memory.

2. The first network device of claim 1, wherein the control circuit is configured to (i) determine whether the amount of the data stored in the memory has exceeded a predetermined threshold, and (ii) transmit the first frame to the media access controller in response to the amount of the data stored in the memory having exceeded the predetermined threshold.

3. The first network device of claim 2, wherein the amount of the data stored in the memory exceeds the predetermined threshold if the first rate at which the media access controller transfers the data from the host to the memory is greater than the second rate at which the physical-layer device transfers the data from the memory to the second network device.

4. The first network device of claim 1, wherein the media access controller is configured to stop storing the data from the host in the memory in response to the first frame.

5. The first network device of claim 4, wherein the media access controller is configured to stop storing the data in the memory for an interval of time specified in the first frame.

6. The first network device of claim 1, wherein the media access controller is configured to operate at (i) the first rate while the physical-layer device is operating at the second rate, and (ii) operate at a third rate while the physical-layer device is operating at a fourth rate.

7. The first network device of claim 6, wherein:
the third rate is greater than 0 and less than the first rate; and
the fourth rate is greater than 0 and less than the second rate.

8. The first network device of claim 1, further comprising a second circuit connected to the media access controller, wherein the second circuit comprises the memory, the control circuit, and the physical-layer device.

9. The first network device of claim 1, wherein the host, the media access controller, the memory, the physical-layer device, and the control circuit are implemented on an integrated circuit.

10. The first network device of claim 1, wherein:
the physical-layer device is configured to receive a second frame from the second network device; and
the control circuit is configured to, in response to the second frame, pause transfer of the data from the memory to the physical-layer device.

11. The first network device of claim 1, wherein:
the media access controller is a single-speed media access controller; and
the physical-layer device is a quad-speed physical-layer device having a plurality of speeds.

12. A method for adjusting a rate at which data is transferred from a media access controller to a memory, wherein the memory is connected between the media access controller and a physical-layer device, and wherein each of the media access controller, the memory, and the physical-layer device are implemented in a first network device, the method comprising:

receiving data from a host at the media access controller, wherein the host is also implemented in the first network device;

storing, via the media access controller, the data in the memory at a first rate;

transferring the data stored in the memory to the physical-layer device;

transmitting, from the first network device to a second network device via the physical-layer device, the data transferred to the physical-layer device, wherein the data transferred to the physical-layer device is transmitted, at a second rate, by the physical-layer device to the second network device, wherein the second rate is less than the first rate;

monitoring, via a control circuit, an amount of the data stored in the memory, wherein the amount of the data stored in the memory is based on each of the first rate and the second rate, wherein the control circuit is connected between the media access controller and the physical-layer device;

based on the amount of the data stored in the memory, transmitting a first frame, via the control circuit, to the media access controller; and in response to the first frame, decreasing the first rate at which the media access controller transfers the data received from the host to the memory.

13. The method of claim 12, further comprising determining whether the amount of the data stored in the memory has exceeded a predetermined threshold, wherein the transmitting of the first frame to the media access controller comprises transmitting the first frame to the media access controller in response to the amount of the data stored in the memory having exceeded the predetermined threshold.

14. The method of claim 13, wherein the amount of the data stored in the memory exceeds the predetermined threshold if the first rate at which the media access controller transfers the data from the host to the memory is greater than the second rate at which the physical-layer device transfers the data from the memory to the second network device.

15. The method of claim 12, wherein the decreasing of the first rate at which the media access controller transfers the data from the host to the memory comprises ceasing to store the data in the memory via the media access controller.

16. The method of claim 15, wherein the decreasing of the first rate at which the media access controller transfers the data from the host to the memory comprises ceasing storage of the data in the memory for an interval of time specified in the first frame.

17. The method of claim 12, wherein:
the media access controller is configured to operate at the first rate while the physical-layer device is operating at the second rate; and
the media access controller is configured to operate at a third rate while the physical-layer device is operating at a fourth rate.

18. The method of claim 17, wherein:
the third rate is greater than 0 and less than the first rate; and
the fourth rate is greater than 0 and less than the second rate.

19. The method of claim 12, wherein the host, the media access controller, the memory, and the physical-layer device are implemented on an integrated circuit.

20. The method of claim 12, further comprising:
receiving a second frame from the second network device at the physical-layer device; and
in response to the second frame, pausing transfer of the data from the memory to the physical-layer device.

* * * * *